(12) United States Patent
Devaney, II et al.

(10) Patent No.: US 11,246,292 B2
(45) Date of Patent: Feb. 15, 2022

(54) SYSTEM FOR PROVIDING A DYNAMIC PORTABLE VIRTUAL BOUNDARY

(71) Applicant: Infinity Collar LLC, Fort Mill, SC (US)

(72) Inventors: Austin D. Devaney, II, The Colony, TX (US); Silas Theodore Adams, Goose Creek, SC (US)

(73) Assignee: Infinity Collar LLC, Fort Mill, SC (US)

( * ) Notice: Subject to any disclaimer, the term of this patent is extended or adjusted under 35 U.S.C. 154(b) by 0 days.

(21) Appl. No.: 16/770,700

(22) PCT Filed: May 29, 2020

(86) PCT No.: PCT/US2020/035129
§ 371 (c)(1),
(2) Date: Jun. 8, 2020

(87) PCT Pub. No.: WO2020/243436
PCT Pub. Date: Dec. 3, 2020

(65) Prior Publication Data
US 2021/0161100 A1    Jun. 3, 2021

Related U.S. Application Data

(63) Continuation of application No. 16/886,569, filed on May 28, 2020, now abandoned.
(Continued)

(51) Int. Cl.
*G08B 23/00* (2006.01)
*A01K 15/02* (2006.01)
(Continued)

(52) U.S. Cl.
CPC .......... *A01K 15/023* (2013.01); *A01K 29/005* (2013.01); *H04W 4/022* (2013.01); *H04W 4/029* (2018.02); *G08B 7/06* (2013.01)

(58) Field of Classification Search
CPC .... A01K 15/023; A01K 29/005; A01K 15/02; A01K 27/00; H04W 4/022; H04W 4/029; H04W 4/021; G08B 7/06; G08B 21/22
(Continued)

(56) References Cited

U.S. PATENT DOCUMENTS 5,161,485 A    11/1992   McDade
5,425,330 A     6/1995   Touchton et al.
(Continued)

FOREIGN PATENT DOCUMENTS

CA    2294321    12/1998
CA    2315041     7/1999
(Continued)

OTHER PUBLICATIONS

Invisible Fence, Inc., 800 Series Transmitters Titanium Computer Collar® Unit Owner's Manual, pp. 9.

*Primary Examiner* — Anh V La
(74) *Attorney, Agent, or Firm* — Kim and Lahey Law Firm LLC; Douglas W. Kim

(57) ABSTRACT

A computerized system for a dynamic portable virtual boundary comprising: a server in communication with a tracking assembly having a server computer readable medium; a portable computer device in communication with the server having a display; a set of server computer readable instructions configured for receiving a boundary information from the portable computer device representing a physical boundary relative to a physical area, receiving a physical location from the tracking assembly, creating an action request according to the physical location and the boundary
(Continued)

information, and transmitting the action request to the tracking assembly, and a set of tracking assembly computer readable instructions configured for determining the physical location of the tracking assembly relative to the boundary information, transmitting the physical location to the server, receiving the action request from the server and actuating a behavior action according to the action request.

14 Claims, 7 Drawing Sheets

Related U.S. Application Data

(60) Provisional application No. 62/854,449, filed on May 30, 2019.

(51) Int. Cl.
*H04W 4/021* (2018.01)
*A01K 29/00* (2006.01)
*H04W 4/029* (2018.01)
*G08B 7/06* (2006.01)

(58) Field of Classification Search
USPC ... 340/539.21, 539.12, 539.13, 686.1, 686.6, 340/573.3
See application file for complete search history.

(56) References Cited

U.S. PATENT DOCUMENTS

| | | | |
|---|---|---|---|
| 5,435,271 A | 7/1995 | Touchton et al. | |
| 5,476,729 A | 12/1995 | Miller et al. | |
| 6,043,748 A | 3/2000 | Touchton et al. | |
| 6,314,695 B1 | 11/2001 | Belleau | |
| 7,046,152 B1 | 5/2006 | Peinetti et al. | |
| 7,068,174 B1 | 6/2006 | Peinetti et al. | |
| 7,117,822 B1 | 10/2006 | Peinetti et al. | |
| D549,119 S | 8/2007 | Becker | |
| 8,448,607 B2 | 5/2013 | Giunta | |
| 9,161,515 B2 | 10/2015 | Dutcher et al. | |
| 2004/0108939 A1 | 6/2004 | Giunta | |
| 2010/0139576 A1 | 6/2010 | Kim et al. | |
| 2014/0180453 A1* | 6/2014 | Weast | A61B 5/6813 700/91 |
| 2014/0261235 A1* | 9/2014 | Rich | A01K 27/009 119/721 |
| 2014/0311421 A1* | 10/2014 | Dutcher | H04W 4/021 119/721 |
| 2015/0373951 A1* | 12/2015 | Kelly | A01K 27/009 119/719 |
| 2017/0265432 A1* | 9/2017 | Anderton | G01S 5/02 |
| 2018/0260905 A1* | 9/2018 | Andreae | H04W 4/029 |
| 2019/0104707 A1* | 4/2019 | Gotts | A01K 27/009 |
| 2019/0162813 A1* | 5/2019 | Price | G01S 5/0027 |
| 2020/0029171 A1* | 1/2020 | Pegg | G08B 21/22 |

FOREIGN PATENT DOCUMENTS

| | | |
|---|---|---|
| CA | 2315804 | 7/1999 |
| CA | 2091368 | 2/2002 |
| CA | 2361060 | 5/2002 |
| CA | 2173169 | 11/2002 |
| CA | 2256442 | 11/2003 |
| CA | 2169261 C | 6/2004 |
| EP | 0714235 B1 | 6/1996 |
| EP | 0720780 B1 | 7/1996 |

\* cited by examiner

SYSTEM FOR PROVIDING A DYNAMIC PORTABLE VIRTUAL BOUNDARY

RELATED APPLICATIONS

This application is a non-provisional application of and claims priority to provisional patent application Ser. No. 62/854,449 filed on May 30, 2019 which is incorporated by reference herein.

FIELD OF THE INVENTION

This system and method related to dynamic portable virtual boundary that can enclose or protect an area from a pet or other mobile animal or object using a containment system without physical boundaries that is configured to be mobile so that the virtual boundary need not be static or limited to one location.

BACKGROUND

There have been attempts to contain pets and other moving objects within a defined area to determine location of the tracked object and to provide notification when the tracked object leaves a certain area. There have been proximity-based virtual fence systems, but these systems suffer from several drawbacks. For example, such virtual fence systems are not configured to be mobile, as changing a location of a fence may require certain electronic components to be removed and re-installed in a different location. For example, U.S. Pat. No. 5,425,330 discloses wire loop antenna that defines the boundary of the area relative to the movement of an animal to be controlled. Because the boundaries relied upon the wire loop antenna, using this system at multiple locations requires either removal and replacement of the wire loop or the purchase of multiple wire loops for different locations. Further, the wire loop antenna is typically placed underground making its removal impractical and prevents the system from being portable.

Also, such virtual fence systems require training of a pet to learn the boundaries of the virtual fences, such as by putting flags, wires, or other visual cues alone the perimeter of the fence. The training process may include the pet wandering around the fenced area and making numerous attempts to transverse the fence, resulting in shocking of the pet. This method provides a negative action in an attempt to change the pet's behavior. Further, research shows that using aversive methods in dog training is associated with an increased risk of fear and aggression and may even be less effective.

For example, U.S. Pat. No. 9,161,515 discloses a custom-shaped wireless fence system is provided that contains one or more dogs in a user-defined containment area without the need for a physical fence or underground wire. The system, which is easy to set up and use, includes at least three base units and at least one collar and, preferably, a remote controller. Each of the base units and the at least one collar includes a component for reducing clock speed variation between the base and collar units, preferably to +/−5 ppm, to effectively eliminate communication errors between the base and collar units. However, these systems are not easily modifiable nor portable.

United States Patent Application 20040108939 discloses A tetherless leash and fencing system comprising a wireless locator, a mapper that maps a perimeter based on a positional reading obtained by the wireless locator, a calculator that determines a vector of movement and position of the wireless locator relative to the perimeter, and a stimulator that generates a stimulus as a function of the vector of movement and the position of the wireless locator relative to the perimeter. If the perimeter is violated, the system determines a further perimeter and the calculator determines a vector of movement and position relative to the second perimeter and not the first perimeter. Also, no stimulation is applied when the first perimeter is crossed from the outside.

United States Patent Application 20100139576 discloses an electronic fence system capable of guiding animals under training to return to a predetermined restricted area is disclosed. The fence system may utilize either a plurality of loops to determine direction of travel for a receiver unit or, alternatively, a GPS system. For embodiments utilizing the GPS system, electronic fences are defined in relation to GPS location information. A lock-down mode is used to contain an animal to a very constricted area when a control command is received to initialize the lock down mode or upon a specified condition. Specified conditions include the animal approaching or entering a specified area or, alternatively, a threshold level of charge being reached for a battery that provides power for the receiver unit.

U.S. Pat. No. 8,448,607 discloses a wireless fencing system comprised of a tetherless leash, a programming fixture, and, optionally, a terminal. The tetherless leash, which is attached to a monitored animal, establishes a "virtual" (i.e., barrier-free) perimeter based on geo-coordinates. The tetherless leash also monitors the position and movement of an animal relative to the virtual perimeter, and delivers warnings, corrections, and praise to the animal in accordance with its programming. The programming fixture serves as a user interface during programming operations since there are no exposed buttons by which a user can directly program the device.

U.S. Pat. No. 7,117,822 is also a system for controlling an animal but is directed to attempting to solve problems inside the home caused by their pets getting into areas that the owner would like to keep them out of. This and other systems do not expand the perimeter in response to perimeter breach of a monitored animal. Rather, these systems can only monitor the animal's speed and location and potentially the direction of movement relative to the perimeter or way points.

However, none of these attempts allow for an easily portable virtual fencing solution for pets. Further, these systems rely upon physical structures such as wire loops and transmitters to define an allowed or protected area. These enclosures or protected areas cannot be defined by the user.

Therefore, it is an object of the present invention to provide for a system for user defined enclosure or protection areas from a portable computer device.

It is another object of the present invention to provide for a portable system that can provide enclosure or protection area.

It is another object of the present invention to provide for a location agnostic virtual boundary system that can reduce or eliminate the shortcomings of proximity-based, physically defined fence systems.

SUMMARY

The above objective can be accomplished by providing a computerized system for a dynamic portable virtual boundary comprising: a controller having a controller computer readable medium and in communication with a tracking assembly; a display included in the controller; a set of controller computer readable instructions included in the controller computer readable medium that can be configured for receiving a physical area image representing a physical area where a tracked object is disposed, displaying the physical area image on the display, and receiving a boundary information from a user representing a physical boundary relative to the physical area for defining at least one of an enclosed area or a protected area, transmitting the boundary information to a tracking assembly; and, a set of tracking assembly computer readable instructions included in the tracking assembly that can be configured for receiving the boundary information from the controller, determining a physical location of the tracking assembly relative to the boundary information and actuating a behavior action when the physical location of the tracking assembly crosses a boundary included in the boundary information.

The behavior action can be taken from the group consisting of emitting an audio signal, administering an electric shock, vibrating, or any combination. The system can include a first behavior action and a second behavior action so that the when a location of the tracking assembly is within a predetermined distance of the boundary included in the boundary information. The set of tracking assembly computer readable instructions can include instructions for determining a trajectory of the tracking assembly and ceasing the behavior action when the trajectory of the tracking assembly is away from the boundary included in the boundary information. The set of tracking assembly computer readable instructions can include instructions for ceasing the behavior action after a predetermined period of time. The set of tracking assembly computer readable instructions include instructions for ceasing the behavior action after a predetermined period of time. The set of tracking assembly computer readable instructions can include instructions for entering tracking mode and transmitting the physical location of the tracking assembly to the controller at a predetermined rate. The set of tracking assembly computer readable instructions can include instructions for actuating the behavior action if the first tracking assembly is determined to be within a predetermined distance of a second tracking assembly. The tracking assembly is a first tracking assembly and the set of tracking assembly computer readable instructions can include instructions for actuating a recall command if a power source included in the tracking assembly is reaches a predetermined power level. The set of tracking assembly computer readable instructions can include instructions for actuating a recall command if a communications signal strength between the controller and the tracking assembly reaches a predetermined signal strength.

A camera can be included in the controller configured to receive the physical area image.

The set of controller computer readable instructions can include receiving a physical area image representing a physical area where a tracked object is disposed, displaying the physical area image on the display, receiving a boundary information from a user representing a physical boundary relative to the physical area for defining at least one of an enclosure area or a protected area, receiving a physical location from the tracking assembly, creating an action request according to the physical location and the boundary information, and transmitting the action request to the tracking assembly. The set of tracking assembly computer readable instructions can include determining the physical location of the tracking assembly relative to the boundary information, transmitting the physical location to the controller, receiving the action request from the controller and actuating a behavior action according to the action request.

The action request can be created according to a trajectory received from the tracking assembly. The controller can be a combination of a portable computer device in communication with a server and the server in communication with the tracking assembly. The set of controller computer readable instructions can include instructions for receiving a second physical location from the tracking assembly, determining a direction of the tracking assembly from the first physical location and the second physical location and sending a second action request to the tracking assembly if the determination is made that the tracking assembly is traveling toward a boundary included in the boundary information. The set of controller computer readable instructions can include instructions for sending a cease action request to the tracking assembly if a determination is made that the tracking assembly is traveling away from an adjacent boundary included in the boundary information. The set of controller computer readable instructions can include instructions for receiving a second physical location from the tracking assembly, determining a trajectory of the tracking assembly from the first physical location, the second physical location and a period of time between the first physical location and the second physical location and sending a second action request to the tracking assembly according to the trajectory.

The system can include a set of server computer readable instructions configured for receiving boundary information from the portable computer device representing a physical boundary relative to a physical area, receiving a physical location from the tracking assembly, creating an action request according to the physical location and the boundary information, and transmitting the action request to the tracking assembly. The set of tracking assembly computer readable instructions can include determining the physical location of the tracking assembly relative to the boundary information, transmitting the physical location to the server, receiving the action request from the server and actuating a behavior action according to the action request. The action request can be created according to a trajectory received from the tracking assembly. The set of tracking assembly computer readable instructions can include instruction for transmitting the physical location of the tracking assembly to the portable computer device.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

Figure 1:
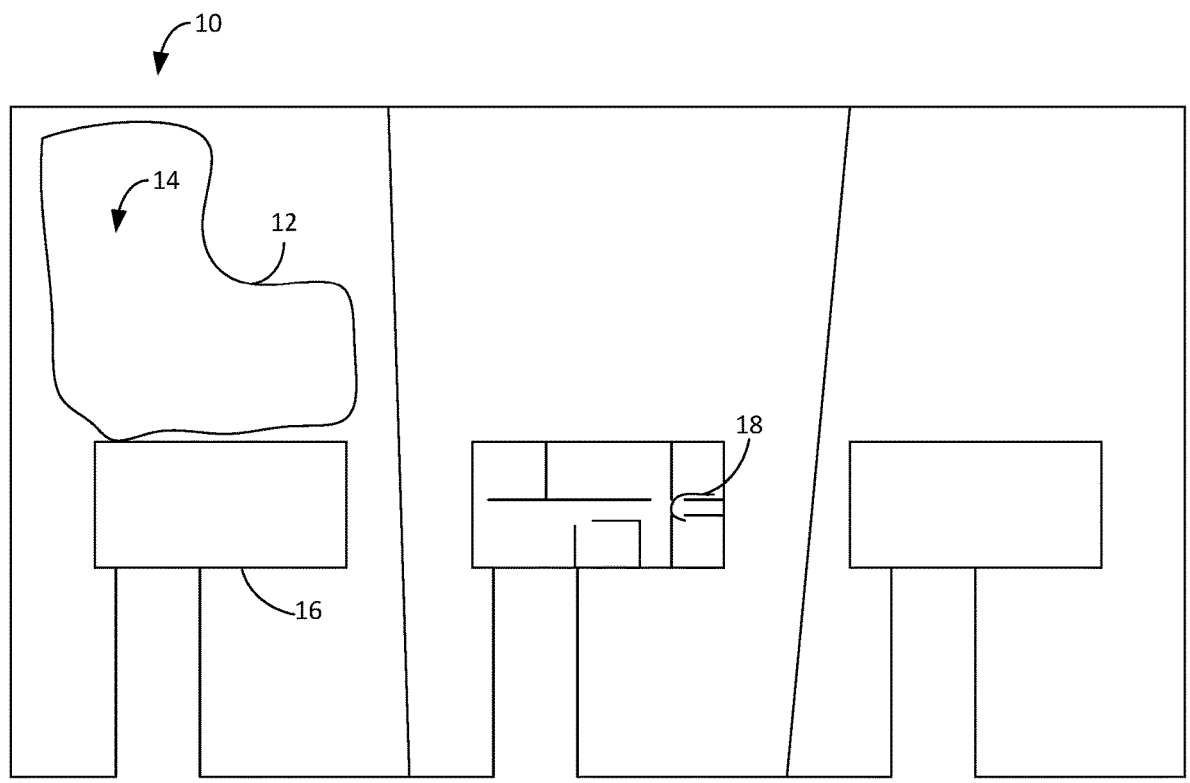
FIG. 1 is a schematic of aspects of the system.

This system is directed to improve the technology and prior art provided by a system allowing for the virtual creation of fences, boundaries, containment areas, exclusion areas, enclosures and protection areas without reliance on hardware to necessarily be placed at or in the respective area. A tracking assembly associated with an object, such as a pet, can receive a virtual enclosure or protection area in response to that information determine the location of the tracking assembly relative to the area. If the tracking assembly exits an enclosure area or enters a protection area, the tracking assembly can provide audio information or stimulation to a tracking assembly.

A controller can be in communications with the tracking assembly and can include a representation of the physical location of interest (e.g. home, yard, vacation spot, and the like). The controller can receive an outline of the area and display boundaries indicators representing the areas. In one embodiment, the tracking assembly can receive the areas and can determine if the tracking assembly is approaching a boundary. The tracking assembly can include GPS, RF, triangulation, velocity of any combination of these to provide its location and compare the location to relevant areas. The controller can be a computer device such as a tablet, smart phone, laptop, portable computer device of the like.

The system can include a tracking assembly in electronic communications with a controller and include a tracking assembly location component, a tracking assembly communication component, and a stimulator component. The controller can include an interface, a processor, and compute readable instructions that, when executed by the processor, cause the controller to: receive a user input indicating a shape and a location of an enclosure or protection area; determine the location of the tracking assembly relative to boundaries received from the controller; and send, based on the shape and the location of the exclusion or protection area and the location of the tracking assembly, an indication to activate the stimulator component to the tracking assembly communication component.

The system can include a stimulator that is configured to activate based on velocity of the tracking assembly. The stimulator can be configured to increase or decrease in strength according to the proximity to a boundary of an enclosure or protection area or the velocity of the tracking assembly. The tracking assembly can include a tracking assembly GPS configured to determine the location of the tracking assembly and a controller GPS configured to associate a virtual boundary with GPS information that can be transmitted to the tracking assembly. The stimulator can be configured to vibrate, provide an audio signal or a combination thereof. The stimulator can be configured to actuate according to the location of tracking assembly being within threshold distance of a boundary or an enclosure area or a protection area. The stimulator can be configured to actuate according to the location of the tracking assembly being outside threshold distance of virtual boundary.

Referring to FIG. 1, an area shown generally as 10 can be used to allow a tracked object such as a pet, to roam. The area can be a backyard of a house 16 or other designated area. However, unrestricted access to the area and the use of boundaries to exclude or include the pet in areas is desired. Therefore, a virtual boundary 12 may be used to contain a pet within a roaming area 14 or exclude the pet from the area. The virtual boundary can be used to contain the pet so that the pet may wander around a defined area while reducing or eliminating escaping from the area premises or undesirable interactions with passersby. The virtual boundary can be of any shape and size desired by the user and can be modified in real time without reliance on physical articles to define the boundaries. The virtual boundaries can be used to bind the pet to a roaming area or exclude the pet from an area. The virtual boundary can also be used to prevent the pet from entering an area such as certain rooms within a home or to maintain a certain distance from objects by using the virtual boundary 18. The system can be configured to use GPS coordinates to define areas or boundaries. The system can use wireless technologies such as WiFi or Bluetooth nodes so that the tracking assembly's distance from the nodes can be used to determine if the tracking assembly is in or out of an area. When two nodes are used, the tracking assembly's location can be triangulated for determining proximity to boundaries. Further, a single node can be used to prevent the pet from entering a radius around the node.

The virtual boundary can be operatively associated with the tracking assembly or other device associated with the pet and configured to contain a pet within the virtual boundary or exclude the pet from the area by activating a simulator on a pet tracking assembly based on the proximity between the tracking assembly and the virtual boundary. The boundary may be defined using global positioning system (GPS) or other location data, rather than positions of electronic devices. As a result, the boundary may be mobile, as a user may change the location of the boundary by redefining the location data of the boundary.

This system can provide for audio information to the pet which can reduce or eliminate the process of training the pet to stay within the boundary of stay away from a boundary. Rather than learning the physical boundaries through visual cues and trial and error, the pet may be trained to associate audio information emitted by a tracking assembly with negative action, such as a shock. Subsequently, the tracking assembly may emit the audio information based on the pet's location or velocity and the virtual boundary's current location, causing the pet to change its speed or direction of travel. The system can be configured so that if the pet leaves an enclosed area or enters a protection area, the pet will be stimulated with a shock of vibration. These negative actions may continue and increase in intensity until the pet's velocity vector shows that the pet is headed into the enclosure or away from the protected area when the negative action can cease. This will encourage the pet to return in a specific direction or out of a prohibited area.

Figure 2:
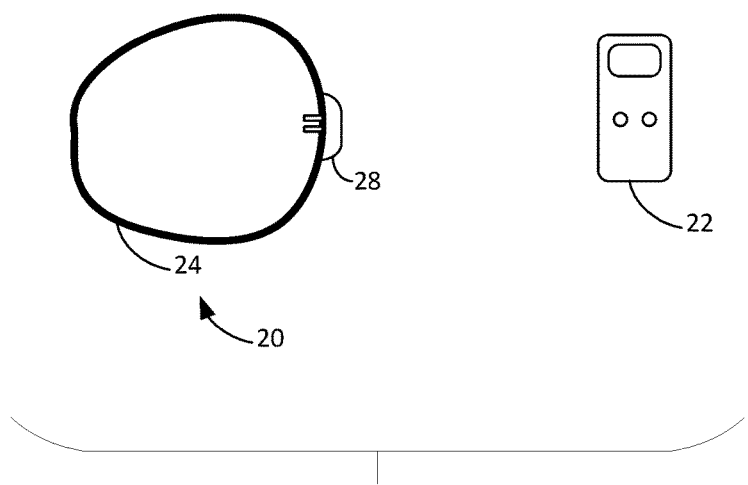
FIG. 2 is a schematic of aspects of the system.

Referring to FIG. 2, the systems and methods for a portable virtual boundary system may comprise a tracking assembly 20 and/or a controller 22. The tracking assembly may be configured to communicate with the controller. The tracking assembly may comprise a body. The body may comprise a strap 24, a band, and/or another object configured to be worn by a pet and/or another animal. The body may comprise fabric, plastic, leather, rope, and/or another material. The body may comprise a single layer or more than one layer. As an example, the body may comprise more than one layer of fabric or leather, wherein electronic components are disposed between the layers and the layers are affixed together by sewing, welding, and/or glue. The electronic components can also be disposed in a housing 28. The tracking assembly may comprise a buckle, a snap, velcro, a button, and/or another fastening mechanism configured to secure the tracking assembly around a neck and/or body of the pet and/or other animal.

The tracking assembly may comprise electronic components. The electronic components may be embedded in the tracking assembly, such as on a side of the body and/or between layers comprising the body. The electronic components may comprise a global positioning system (GPS) receiver. The electronic components may comprise a gyroscope. The electronic components may comprise an accelerometer.

The electronic components may comprise a stimulator. The stimulator may be configured to output a vibration or a shock to the pet. The electronic components may comprise an audio output component, such as a speaker, configured to emit noise. The noise may be at a pitch that is audible to pets, other animals, and/or not to humans. The electronic components may comprise a radio frequency (RF) transmitter. The electronic components may comprise a processor. The electronic components may comprise a memory and/or storage.

The electronic components of the tracking assembly may comprise a biometric monitor. The biometric monitor may comprise a sensor and/or an electrode, as an example. The biometric monitor may be configured to monitor a biometric of a pet or another animal wearing the tracking assembly. As an example, the biometric component may be configured to monitor a heartrate, weight, steps per interval of time (e.g., minute, day, etc.), and/or caloric intake of the pet and/or animal.

The electronic components may comprise a power component, such as a battery. The battery may be disposable, such as a lithium cell ion battery. The battery may be rechargeable. The battery may be configured to be recharged external to the controller, such as in a charging station. The battery may be configured to be recharged inside the controller. For example, the controller may have circuitry configured to connect to an outside power source and deliver power to the battery inside the controller. The controller could be configured to recharge the battery using energy generated by the motion of the pet wearing the tracking assembly. The controller may comprise a housing for the batteries. The housing may be configured to receive or expel the batteries, such as a slide-out configuration.

The controller may comprise a mobile device, such as a tablet device, a mobile phone, a laptop device, or a specialized remote control. The controller may comprise circuitry. The circuitry may comprise power components, such as a battery. The battery may be disposable, such as a lithium cell ion battery. The battery may be rechargeable. The battery may be configured to be recharged external to the controller, such as in a charging station. The battery may be configured to be recharged inside the controller. For example, the controller may have circuitry configured to connect to an outside power source and deliver power to the battery inside the controller. The controller may comprise a housing for the batteries. The housing may be configured to receive or expel the batteries, such as a slide-out configuration.

The controller may comprise communication components. The communication components may comprise an RF receiver and/or transmitter. The communication components may comprise a cellular, Bluetooth, near field communication (NFC), or other communication protocol receiver and/or transmitter. The controller may comprise a housing enclosing the circuitry and/or the communication components. The controller may comprise an interface. The interface may comprise a display. The display may comprise a screen, such as a touchscreen. The touchscreen may be configured to output a graphic user interface (GUI). The interface may comprise buttons, such as buttons associated with alphanumeric characters, buttons associated with directions, and/or buttons associated with other inputs. The controller may include a GPS chip or assembly.

Figure 3:
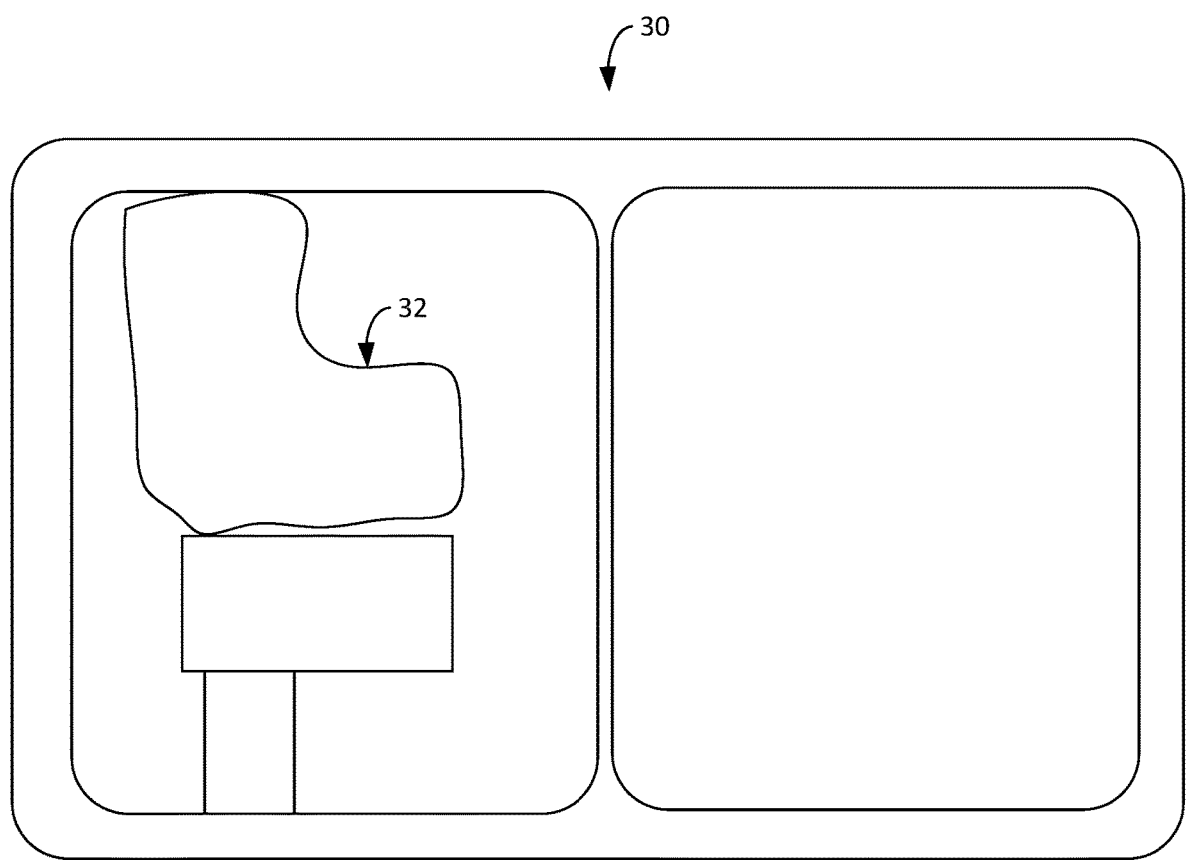
FIG. 3 is a schematic of aspects of the system.

Referring to FIG. 3, the controller 30 may be a tablet or other portable computer device that can include a processor and memory. The memory may store computer readable instructions and/or software. The instructions and/or software may be configured to be executed by the processor. When executed, the instructions and/or software may cause a program to be executed on the controller. The program may comprise a customizable mapping feature. The mapping feature may enable a user to demarcate the virtual boundary 32. As an example, the controller can allow the user may draw a map of an area of interest, such as a yard of a home, area of a beach or other area. The controller can also allow creating of a virtual perimeter by moving the controller around the physical area so that the location of the controller corresponds to the virtual boundaries. For example, the user can walk around the property holding the controller and as the controller is positioned around the property, the controller creates the virtual perimeter. The virtual perimeter, once created, can be edited by the user using the controller touch screen, repositioning the controller or otherwise entering input into the controller. The controller can retrieve imagery from the third parties or local computer networks (e.g. Google Maps, Google Earth, GIS data, customer data, or the like or any combination) and display a representation of the area of interest on the controller or portable computer device. The controller, server or portable computer device can also store previously retrieved maps for subsequent use when local computer networks are unalienable or for improved efficiencies. The user can then add a virtual boundary to the map as an overlay, such as by using the controller such as by using a touchscreen. As another example, the user may input coordinates of the boundary, such as coordinates of corners of the boundary or of a center point of the boundary. The coordinates may comprise GPS coordinates. The user may input dimensions of the boundary, such as a size of a side of the boundary.

The user may input a shape of a perimeter or a boundary of the boundary. The shape may comprise a geometric shape, such as an asymmetrical shape or a symmetrical shape. The shape may be irregular. The shape may comprise linear segments and/or non-linear segments, such as curved segments. The user may input the shape by selecting from a menu of predefined shapes and inputting the dimensions and/or the shape on a geographic location. The user may customize the shape such as by drawing the shape. The user may draw the shape via the touchscreen, such using a finger, stylus, or other drawing instrument. The user may draw the shape using press able buttons or rotatable knobs that are associated with drawing directions. The user may input the characteristics of the boundary via the interface, such as by using buttons or touching the display.

The tracking assembly may receive an indication of the location of the boundary, such as from the controller. The tracking assembly may store the boundary location information in the memory or storage of the tracking assembly. The tracking assembly may receive GPS information associated with a current location of the tracking assembly and/or the animal wearing the tracking assembly, such as via the receiver. Alternatively, and/or additionally, the controller may determine the location of the controller, such as by receiving location data from the tracking assembly and/or a base station. The controller may receive GPS data, accelerometer data, and/or gyroscope data indicating the tracking assembly's location. The controller may determine the location of the tracking assembly based on one or more of the GPS data, accelerometer data, and/or gyroscope data. The controller may average the GPS data, accelerometer data, and/or gyroscope data, such as using a weighted algorithm. The controller may weigh the GPS data, accelerometer data, and/or gyroscope data and may determine the most accurate data set and/or average the data sets.

Based on the current location of the tracking assembly and/or the location of the boundary, the stimulator the stimulator may be triggered. Based on a distance between the tracking assembly and/or the location of the virtual boundary, the stimulator may be triggered. For example, based on the tracking assembly being within a predetermined threshold distance from the virtual boundary, the stimulator may be triggered. As a result, feedback may be provided to the pet in advance of the pet leaving the designated virtually boundary area or entering a virtual boundary area. Based on a change in the distance between the tracking assembly and the virtual boundary or virtual boundary, such as when a pet approaches the virtual boundary or virtual boundary, the stimulator of the tracking assembly may be triggered. Based on the distance between the tracking assembly and the virtual boundary or virtual boundary decreasing, the strength of an output of the stimulator may be increased. Based on the distance between the tracking assembly and the virtual boundary or virtual boundary increasing, such as when the pet approaches the boundary, the strength of an output of the stimulator may be decreased.

Based on a velocity of the tracking assembly, such as based on a velocity of the pet or animal wearing the tracking assembly, the stimulator may be triggered. Based on a velocity of the tracking assembly, the distance from the virtual boundary or virtual boundary at which the stimulator may be triggered may be determined. For example, the stimulator may be triggered at a greater distance from the virtual boundary or virtual boundary when the tracking assembly is moving at a greater velocity and a lesser distance from the boundary when the tracking assembly is moving at a lower velocity.

While the stimulator may be triggered based on proximity of the tracking assembly to the virtual boundary or the virtual boundary, triggering the stimulator based on tracking assembly location data may have technical advantages. For example, if a stimulator is triggered based on the tracking assembly coming within a threshold distance of a virtual boundary, the time between a pet or animal reaching the threshold distance and traversing the virtual boundary or virtual boundary may be minimal if the pet or animal is traveling at a high velocity. Triggering of the stimulator for that short time interval may not be sufficient to deter the pet from progressing on its current trajectory over the virtual boundary or virtual boundary. However, based on a current location of the tracking assembly, a velocity of the tracking assembly (e.g., velocity of the pet or animal wearing the tracking assembly), and/or the location of the virtual boundary or virtual boundary, the stimulator may be triggered with sufficient time to deter the pet or animal from continuing at its current speed or in its current direction. In addition, the stimulator may continue to stay activated and/or increase in strength after the pet or animal crosses the virtual boundary or virtual boundary. For example, based on the pet crossing the virtual boundary, the stimulator may stay activated regardless of the distance of the pet from the virtual boundary or virtual boundary. The stimulator may deactivate or decrease in intensity based on the pet or animal returning to the virtually boundary area or behind the virtual boundary, such as to encourage the pet to return to the boundary area.

An indication of a current location of the pet may be output to the user, such as via the controller, based on the pet leaving the boundary area or nearing a virtual boundary, a notification may be output to the user, such as via the controller.

Based on the distance between the tracking assembly and the virtual boundary, the audio output component may be triggered, such as by emitting a sound. For example, based on the tracking assembly crossing a predetermined threshold distance from the virtual boundary or virtual boundary, the audio output component may be triggered. Based on a change in the distance between the tracking assembly and the virtual boundary, the audio output may be changed. Based on the distance between the tracking assembly and the virtual boundary or virtual boundary decreasing, the volume may be increased. Based on the distance between the tracking assembly and the virtual boundary or virtual boundary decreasing, the volume may be decreased. Based on the distance between the tracking assembly and the virtual boundary or virtual boundary changing, the tone of the audio output may be changed. Based on a velocity of the tracking assembly, such as based on a velocity of the pet or animal wearing the tracking assembly, the audio output may be triggered.

The controller may be configured to receive biometrics data from the tracking assembly. The controller may be configured to output an indication of the biometrics data, such as via the display. The user may input known biometric data associated with the pet, such as weight, size, age, or diet of the pet. The controller may be configured to determine health information or recommendations, based on the biometrics data from the tracking assembly and/or the known biometrics data from the user. For example, based on the heartrate, weight, and or steps per time interval of the pet and/or animal wearing the tracking assembly, the controller may determine a recommendation for a type of food, amount of food, or daily caloric intake for the pet and/or animal. The controller may determine a recommendation for an amount or type of exercise for the pet. The controller may determine if the pet is getting enough exercise. The controller may determine a number of calories expended by the pet.

Figure 4:
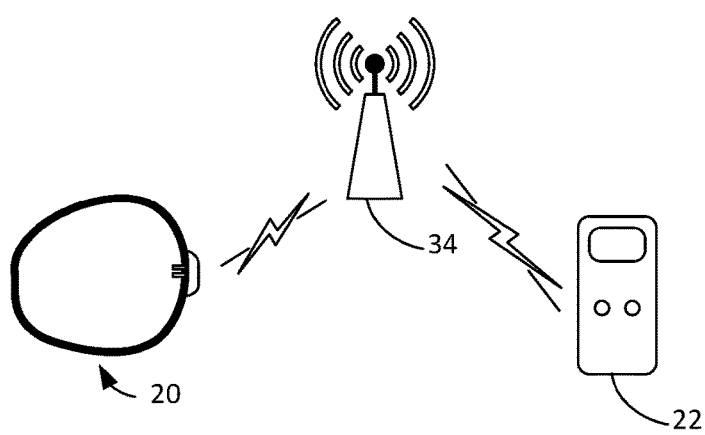
FIG. 4 is a schematic of aspects of the system.

Referring to FIG. 4, the tracking assembly 20 and/or controller 22 may be in communication with a base station 34. The base station can be a local base station or station associated with a wireless network such as a cellular network. The controller can be in communications with tracking assembly directly or through a server. The base station can be a transceiver, communications connection to a wide area network, global communications network, local device or remote server and be a wired or wireless communications connection. The base station can be part of or communication with an existing network such as a cellular network or WiFi network. The base station may receive data from the tracking assembly and/or the controller, such as the location of the tracking assembly and/or biometric data. The base station may perform computations, such as determinations when to activate the stimulator of the tracking assembly and/or nutrition recommendations. The base station may send indications of the computations to the controller. Based on receiving the computations, the controller may output information and/or notifications, such as via the display of the controller.

If the controller comprises a mobile device such as a mobile phone, the mobile device may control the tracking assembly using an application or may be in communications with a server that is in communications with the tracking assembly. The portable computer device or the server may perform computations, such as determinations when to activate the stimulator of the tracking assembly and/or nutrition recommendations. The portable computer device may send indications of the computations to the server. Based on receiving the computations, the server may output information and/or notifications, such as via the display of the controller or other computing device. The server can communicate with the tracking assembly using a wireless network such as a cellular network eliminating the need or proprietary communications hardware.

The tracking assembly could be configured to communicate with both a mobile device and a different specialized remote control. For example, if a user wants to leave the specialized remote control at home, such as if the user is going on a walk and wants to minimize items to carry, the user may use the mobile device, such as a mobile phone, to control the tracking assembly. As another example, if a user wants to use the system in a location that does not have cell phone service, such as while hiking or camping in wilderness, the user may control the tracking assembly using the specialized remote control, as the tracking assembly and the controller may still communicate using RF.

In addition to mobility, the present systems and methods have the advantage of being dynamic. Other virtual boundary systems that require training of a pet to orient itself with the perimeter of the virtual boundary, may require re-training the pet based on a change of location of the boundary or a removal of the boundary. Using the present systems and methods, a user may modify the dimensions of the virtual boundary or virtual boundary via the controller. The user may remove a single segment and/or side of the virtual boundary or virtual boundary, allowing the user to control the direction from which the pet exits the designated area. Alternatively, and/or additionally, the virtual boundary or virtual boundary may be removed or moved automatically, such as based on the occurrence of a trigger event. As a result of the user changing the virtual boundary or virtual boundary, the tracking assembly may no longer stimulate the pet or emit noise based on the tracking assembly's location (e.g., location of the pet wearing the tracking assembly) relative to the pre-existing virtual boundary or virtual boundary. Instead, the tracking assembly may provide the pet feedback based on the tracking assembly's location relative to the new virtual boundary or will not provide feedback if the boundary is removed and no new boundary is defined.

In an illustrative example, in an emergency situation, the virtual boundary can be modified to even be removed, allowing the pet an escape from the danger or hazard. In another illustrative example, a user may bring a pet on a hunting trip. While the user is shooting, the user may define a virtual boundary to contain the pet in a safe area. Once the user hits a target, such as a bird, the user may remove the boundary, allowing the pet to exit the previously boundary area to retrieve the target.

Additionally, the present systems and methods allow a user to take a pet outside of a designated area without removing the tracking assembly from the pet. Virtual boundary systems having boundaries that cannot dynamically be moved or removed may require a user to remove the tracking assembly from the pet in order to allow the pet to exit the boundary areas. In contrast, using the present systems and methods, the user may de-activate the boundary or a boundary of the boundary or move the boundary, such as via the controller, without removing the tracking assembly.

While this application describes the systems and methods as used for a pet, the systems and methods could be used for other animals, as well. For example, the systems and methods could be used for livestock, such as cattle.

While the described systems and methods may also be used to constrain a pet within an enclosed area, the system and methods may also be used to keep a pet outside (e.g., prevent a pet from entering a protected area) a defined area and/or from crossing a virtual boundary. As an example, a user may wish to prevent a pet from entering a room of a house, such as a kitchen or a bedroom. Via the controller, the user may create a boundary at the entrance of the room. Alternatively, the user may create a boundary around the perimeter of the room. The pet may wear the tracking assembly and roam within the house. However, based on the location of the pet being within a threshold distance of the boundary, stimulator components and/or audio components in the tracking assembly may be activated. Based on a change in location of the pet, the strength of the stimulation, the volume of the sound, and/or the pitch of the sound may be modified. Based on the distance between the pet and the boundary exceeding the threshold distance, the strength of the stimulation, the volume of the sound, and/or the pitch of the sound may be modified and/or turned off.

In one embodiment, the tracking assembly can determine its proximity to a node and the distance can be used to determine if the tracking assembly is approaching or crossing a virtual boundary, approaching or entering a protected areas or otherwise engaging gin movement relative to the node.

As another example, a user may wish to open a door to a building for ventilation, while preventing the pet from exiting the building through the door. Via the controller, the user may create a boundary at the threshold of the door. The pet may wear the tracking assembly and roam within the building. However, based on the location of the pet being within a threshold distance of the boundary, stimulator components and/or audio components in the tracking assembly may be activated. Based on a change in location of the pet, the strength of the stimulation, the volume of the sound, and/or the pitch of the sound may be modified. Based on the distance between the pet and the boundary exceeding the threshold distance, the strength of the stimulation, the volume of the sound, and/or the pitch of the sound may be modified and/or turned off.

As another example, the user may wish to keep a pet out of an area, such as a food preparation area at a picnic. Via the controller, the user may create a virtual boundary around the area. The pet may wear the tracking assembly and roam freely, such as around a park. However, based on the location of the pet being within a threshold distance of a boundary of the virtual boundary, stimulator components and/or audio components in the tracking assembly may be activated. Based on a change in location of the pet, the strength of the stimulation, the volume of the sound, and/or the pitch of the sound may be modified. Based on the pet leaving the boundary area and/or the distance between the pet and the boundary exceeding the threshold distance, the strength of the stimulation, the volume of the sound, and/or the pitch of the sound may be modified and/or turned off.

Figure 5:
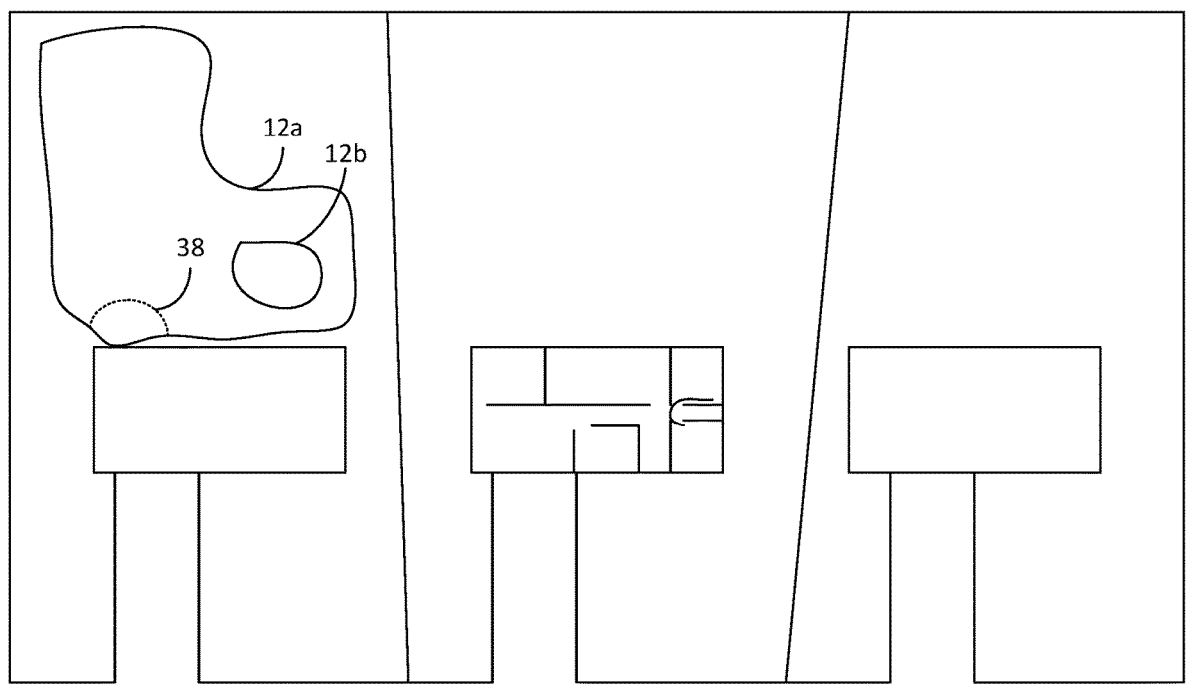
FIG. 5 is a schematic of aspects of the system.

Referring to FIG. 5, the present systems and methods may be used to create a virtual boundary 36 within a virtual boundary 12, such as to constrain a pet to an area, while preventing the pet from entering a sub-area within the area. As an illustrative example, a user may wish to constrain a pet to a yard but may wish to prevent the pet from entering a flowerbed in the yard. Via the controller, the user may create an outer virtual boundary 12*a* and an inner virtual boundary 12*b* within the outer virtual boundary.

The present systems and methods may be used to create a virtual gate 38. For example, a user may define a virtual boundary having a one-directional boundary. A pet may cross the boundary in one direction but may be prevented from crossing the boundary in the other direction. The one-directional boundary may comprise a segment of a perimeter of the virtual boundary. The one-directional boundary may comprise a standalone or disjointed boundary, such as a boundary that does not connect to another segment of a virtual boundary. Based on the user defining the one-directional boundary, the tracking assembly may not provide feedback based on the pet crossing the boundary in the permitted direction but may provide feedback to the pet crossing the boundary in the prohibited direction.

As another example, the user may keep the pet away from a geospatial point or an object. Via the controller, the user may indicate the location of the object or the geospatial point. As an illustrative example, a pet may have a habit of rummaging through a garbage can or scratching on a mailbox post. Via the controller, the user may enter the location of the garbage can or the mailbox. The pet may wear the tracking assembly and roam freely. However, based on the location of the pet being within a threshold distance of the geospatial point, stimulator components and/or audio components in the tracking assembly may be activated. Based on a change in location of the pet, the strength of the stimulation, the volume of the sound, and/or the pitch of the sound may be modified. Based on the distance between the pet and the geospatial point exceeding the threshold distance, the strength of the stimulation, the volume of the sound, and/or the pitch of the sound may be modified and/or turned off.

The described systems and methods may also be used to limit contact between two or more pets. As an example, a user may wish to limit contact between two pets that behave in a hostile manner towards each other. As another example, a user may wish to limit contact between a pet who is ill and/or has a parasite and a pet who is well and/or does not have a parasite. As another example, a user may wish to limit contact between a pet who has stitches and/or is recovering from surgery and another pet who is a playmate of the recovering pet.

To limit contact between two or more pets, a user may put a tracking assembly on each of the pets. The user may pair a controller with the tracking assembly. Via the controller, the user may input a command to limit a distance between the two pets. If the locations of each of the tracking assembly meets or is less than a threshold distance, stimulator components and/or audio components in the tracking assembly may be activated. Based on a change in location of one or more of the tracking assemblies, the strength of the stimulation, the volume of the sound, and/or the pitch of the sound may be modified. Based on the distance between the pets exceeding the threshold distance, the strength of the stimulation, the volume of the sound, and/or the pitch of the sound may be modified and/or turned off.

Figure 6:
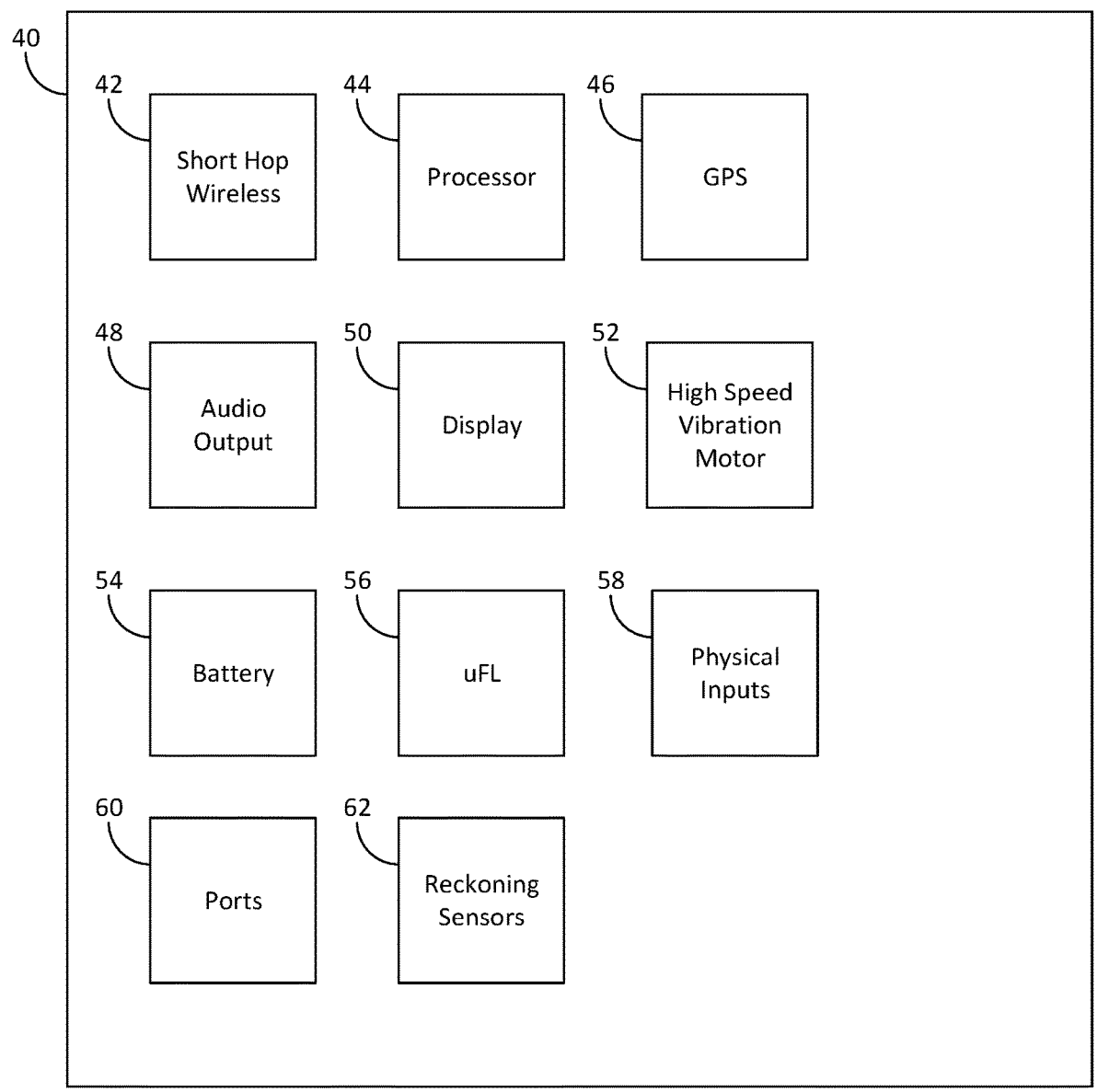
FIG. 6 is a schematic of aspects of the system.

Referring to FIG. 6, the electronic components that may be included in the tracking assembly are shown. A feather board 40 can include a short hop wireless transceiver 42. The short hop wireless transceiver can be configured to allow the integration of packetized radio or long-range radio for distances exceeding a kilometer. The short hop wireless transceiver can be configured to be paired with WiFi, cellular or Bluetooth allowing communications between the Internet and a mobile device. A Processor 44 can be included. In one embodiment, the processor can include a 1 GHz ARM11 core, 512 MB of LPDDR2 SDRAM, a micro-SD card slot, a mini-HDMI socket for 1080p60 video output, a micro-USB sockets for data and power, and a form factor of about 65 mm×30 mm×5 mm. A GPOS module 46 can be included with the ability to use the BeiDou, Galileo, GLONASS or GPS/QZSS global navigation satellite system. The GPS can be configured to use up to three systems simultaneously allowing for international applications and remote uses such as vacations in area such as Indonesia and the South Pacific.

An audio output module 48 can be included configured to operate as a buzzer of other audio to provide warning or signals to the pet. Actuators 58 can be included such as physical or contact buttons. A display screen can be included for providing output. A high-speed vibration motor 52 can be included to provide tactile information to the pet. A power source 54 can be included such as lithium ion batteries that can be replaced or recharged. A uFL antenna connector can be included and can have an external antenna affixed or removably attached. Ports 60 can be included for the transmission of data.

The electronic components can also include dead-reckoning or reckoning sensors 62 such as gyroscopes and accelerometers. These reckoning sensors can be used to determine the relative position of the tracking assembly without the use of external nodes or GPS. These reckoning sensors can also be used to verify GPS reliability in one configuration. Reckoning sensors can be useful indoors or in covered areas (forest, etc.) where the GPS unit does not have a clear line of sight to the satellites.

The system will also have the ability to issue a return command to the pet designate by a different tone which can be used to indicate to the pet that the pet is to return to a specific location, e.g. home, the owner of the like. This tone can be distinguished from the tone associated with leaving a boundary area or crossing a boundary. Other tones can also be used and associated with commands, behaviors, and the like for the pet.

Figure 7:
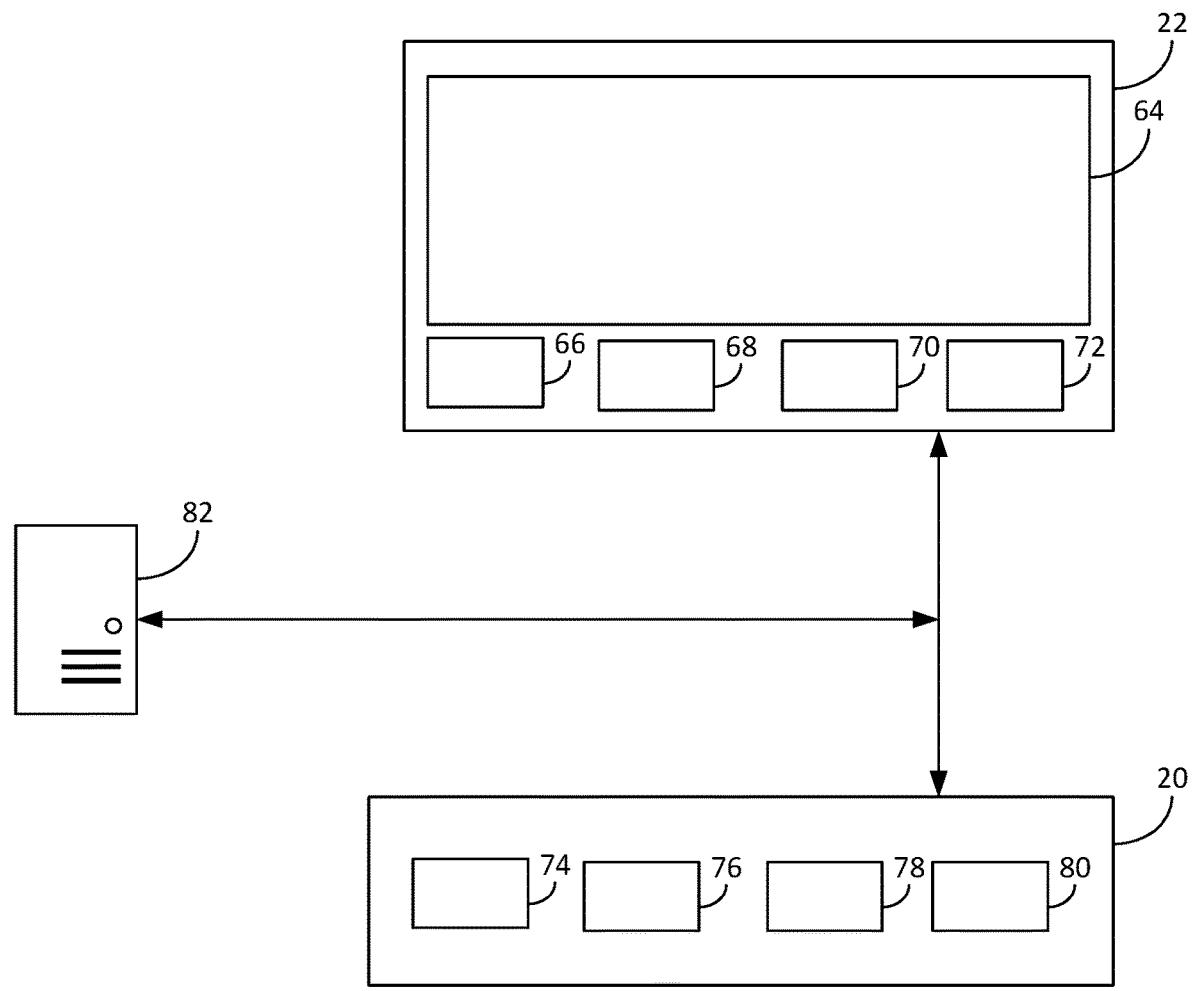
FIG. 7 is a schematic of aspects of the system; and,
FIGS. 8A and 8B are a flow charts of aspects of the system.

Referring to FIG. 7, the tracking assembly and controller can be seen in further detail. The controller 22 can be in communications with the tracking assembly 20. The controller can include a touch screen display 64 and camera. The touch screen can be used to draw the virtual boundary that can be transmitted to the tracking assembly. The camera can be used to capture an image of a desired areas and display the desired areas on the touch screen. The user can then draw boundaries for exclusion or protected areas over the displayed areas so that the user can visually see the virtual boundaries in relationship with the physical area associated with the virtual boundary. The display can also retrieve a plan view of the desired property or area and display that to the user. The user can then draw or otherwise input the virtual boundaries over the plan view so that the user can see the virtual boundaries in relationship with the physical area where the pet is to roam. The display 64 can be a touch screen to facilitate input of the virtual boundaries. The controller can include a power source 66, input 68 such as a button, transceiver 70 and microcontroller 72. The tracking assembly can include an accelerometer 74, transceiver 76, power source 78 and microcontroller 80. A server, including a remote server, 82 can be in communications with the controller and the tracking assembly.

Figure 8A:
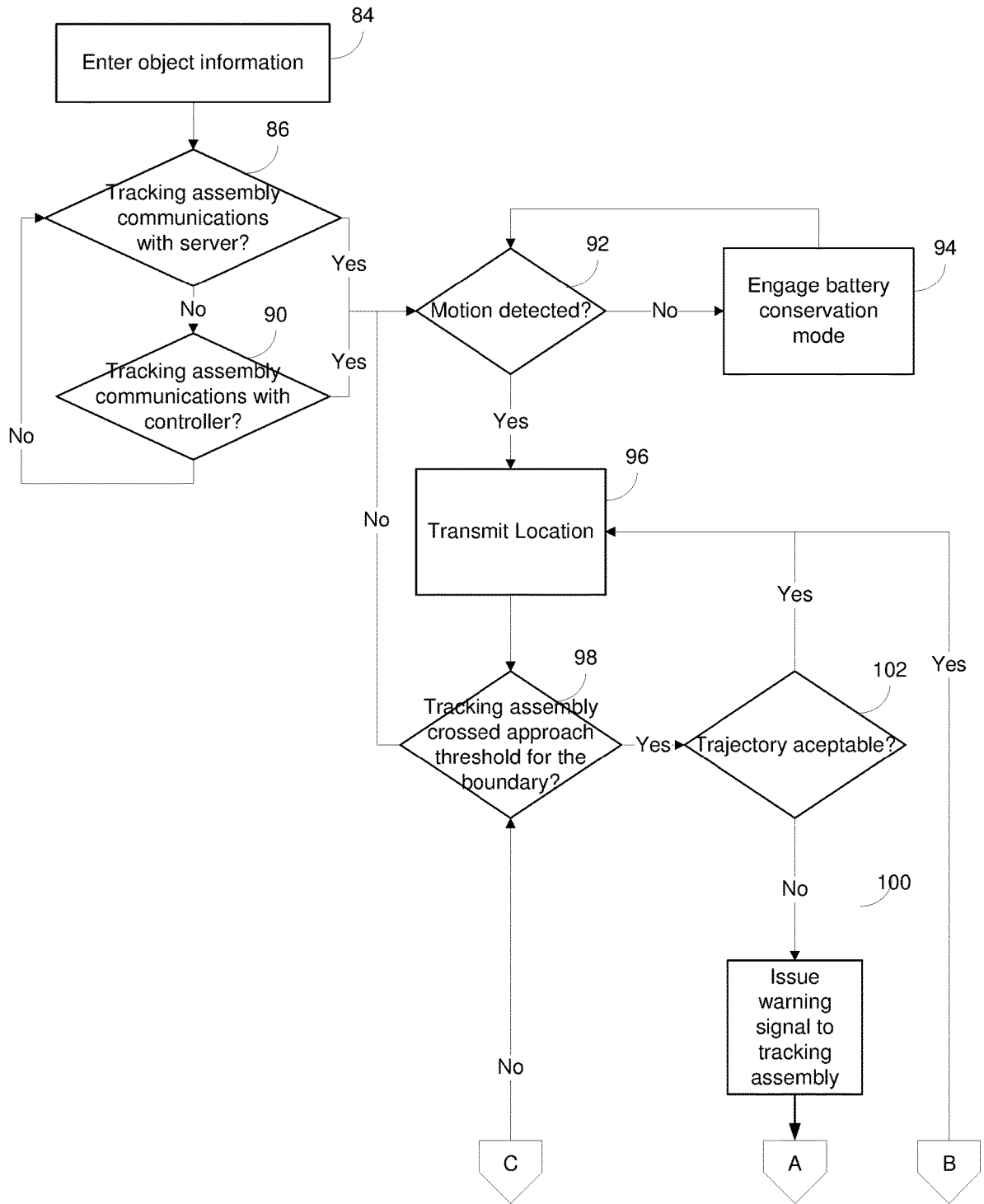
Figure 8B:
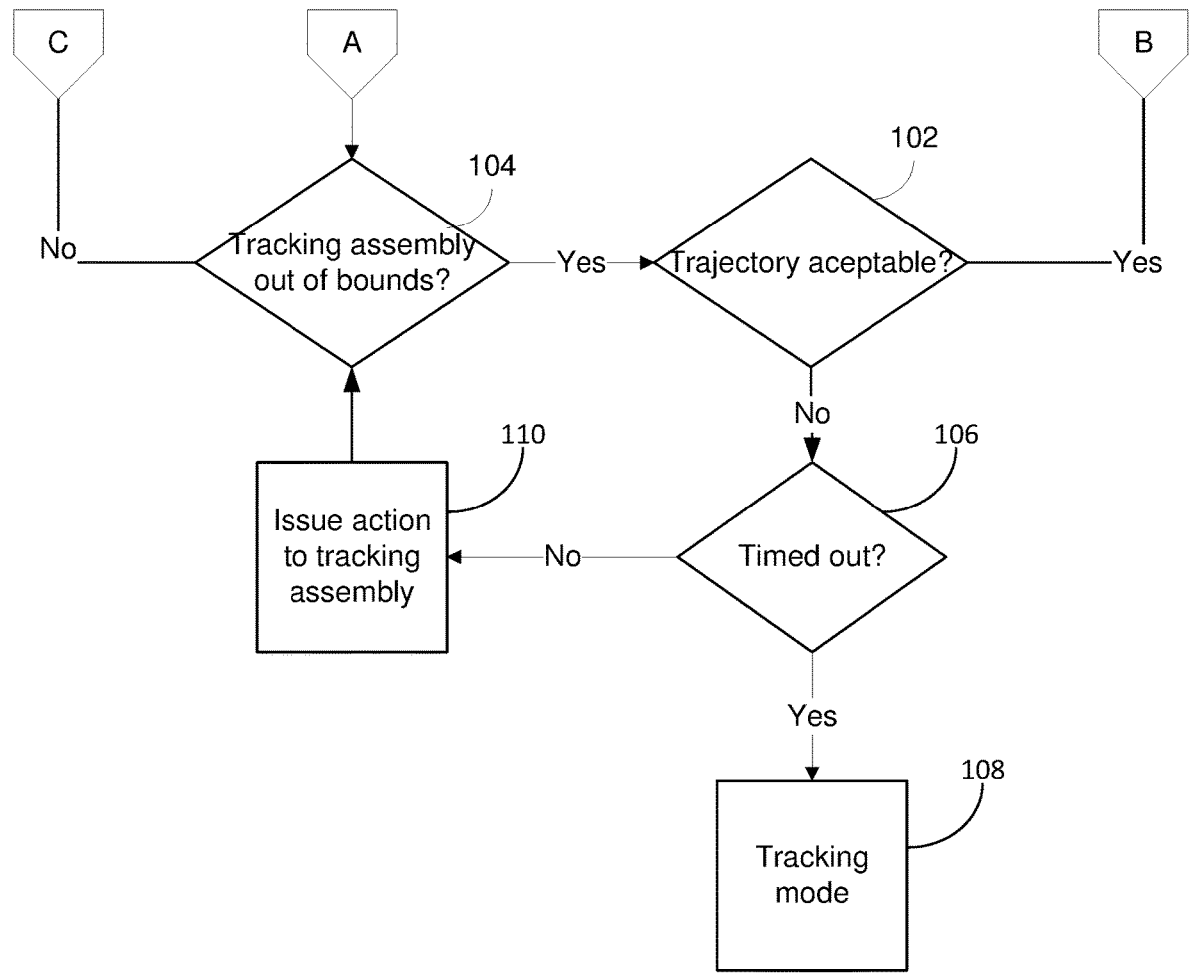

Referring to FIGS. 8A and 8B, aspects of the operations of the system is shown. At 84, the user can enter information about the tracked object. If information can include the object's description (e.g. pet's name), height, weight, color, breed, and the like. The information can be entered into the controller including an app if the controller is a smartphone. The tracking assembly can be in communication with the server at 88 and the server can identify the tracking assembly with a unique identifier. The server can retrieve information from a set of data that associates the tracking assembly with the controller. The server's computer readable instructions can then receive location information from the tracking assembly to the controller. At 90, the tracking assembly can transmit the tracking assembly identifier and location data of the tracking assembly to the controller.

In operation the tracking assembly can determine if the tracking assembly is stationary for a predetermined period of time at 92 and after the predetermined period of time, the status of the tracking assembly can be transmitted to the controller or the server or both. The computer readable instructions of the tracking assembly can place the tracking assembly into a power conserve mode at 94. The tracking assembly can be placed in an operational mode once movement of the tracking assembly is detected. The movement of the tracking assembly can be determined by the accelerometer, signal strength, GPS data, or any combination. If the tracking assembly determines that there is movement at 92, by a change in GPS data, cellular data, accelerometer data and the like, the tracking assembly collar can transmits location data to the controller or the server or both at 96. The server or controller or both can determine if the location of the tracking assembly places the tracking assembly in a protected area or outside an enclosure area or within a predetermined distance of a virtual boundary at 98. If the boundary is being approached, the tracking assembly can receive an action instruction from the controller, server or both and provide a behavior action for warning to the tracked object, such as a pet at 100. The behavior action can include emitting an audio signal, administering an electric shock, vibrating, or any combination. A determination can be made at 102 if the tracking assembly's trajectory is in an acceptable direction such as into the enclosure or away from the protected area. If so, the tracking assembly can be instructed to reduce or cease actuating the warning. If there is a determination that the boundary has been crossed and the tracking assembly is outside an enclosure area or inside a protected areas at 104, the server or controller or both can determine the tracking assembly's trajectory and action by the tracking assembly can be performed until the trajectory is not into the enclosure area of out of the protected areas.

The controller or server or both can determine if an action needs to be taken and transmit the requested action to the tracking assembly. The tracking assembly can also record, determine, and transmit information representing the tracking assembly's velocity and changes in velocity as well as increase transition frequencies relative to the changes in location information. For example, the tracking assembly may transmit location information once every 60 seconds when the tracking assembly is at rest and once every second when the tracking assembly detects motion more than 5 miles per hour. The tracking assembly can transmit in the range of 30 to 120 seconds when in rest and in the range of 0.1 to 2.0 second when the tracking assembly is in motion.

In the event that the tracking assembly determines that the tracking assembly has been out of bounds for a predetermined period of time at 106, the requested action can be ceased. If the system has not timed out, the action can be sent to the tracking assembly at 110. The tracking assembly can then go into tracking mode wherein the location of the tracking assembly is transmitted to the controller, server or both at 108. Once the tracking assembly returns to the enclosure area or out of the protected area, the operation of the tracking assembly can result to normal operations and exit the tracking mode. In tracking mode, the server, controller, tracking assembly or any combination can begin monitoring the tracking assembly movement at a high frequency. The tracking assembly itself can provide the location to the server, controller, or other computer device through wireless transmission such ash cellular network, and the like. In one embodiment, the tracking assembly can include a cellular transceiver that is dormant until the tracking assembly enters tracking mode.

The tracking assembly can also determine if it is proximity to an un-friendly second tracking assembly. In the event that there are two tracking assemblies within a certain area, the server, controller or tracking assembly can determine that the first tracking assembly is too close to the second tracking assembly and a requested action can be send to one or more of the tracking assemblies. Therefore, the pets are dissuaded from being in too close contact with each other.

The tracking assembly can include a notification when the power source reaches a predetermined level allowing the user to charge or replace the power source. When the power source reaches a predetermined level, transmissions can cease the tracking assembly, rely on an internal GPS system to provide actions based upon its location and virtual boundary information stored in the tracking assembly. Further, when the tracking assembly reaching a predetermined level, the server, controller, or both can be notified allowing a user to initiate a recall command. The tracking assembly can take a recall action that can be associated with pet informing the pet to return to the user or specified location. This notification and recall action can also be initiated when the controller power level reaches a predetermined level or when the tracking assembly determined that communications integrity reaches a predetermined level. For example, if the wireless network being used by the tracking assembly has insufficient signal integrity, the recall function can be initiated.

The described systems and methods may also be used as a virtual leash. The electronic components of the tracking assembly may comprise a communication component, such as a Bluetooth component. The systems and methods may comprise a module configured to communicate with the communication component. The module may comprise the controller or a different device. The module may be portable, such as a device configured to be carried by the user, such as when walking the pet. Based on a distance between the module and the tracking assembly exceeding a threshold distance, stimulator components and/or audio components in the tracking assemblies may be activated. Based on the activation of the stimulation components and/or the sound emitted, the pet may be motivated to stay near the user or increase its proximity to the user. Based on the strength of the connection between the communication component and the module falling below a threshold strength, stimulator components and/or audio components in the tracking assembly may be activated. Based on a change in the distance between the tracking assembly and the module and/or a change in the strength of the connection, the strength of the stimulation, the volume of the sound, and/or the pitch of the sound may be modified. Based on the distance between the tracking assembly and the module falling below the threshold distance, the strength of the stimulation, the volume of the sound, and/or the pitch of the sound may be modified and/or turned off. Based on the strength of the connection meeting or exceeding the threshold strength, the strength of the stimulation, the volume of the sound, and/or the pitch of the sound may be modified and/or turned off. As a result, the pet may follow or stay near the user. In one embodiment, the tracking assembly includes using a GPS system to track continuously or predetermined sampling rates. The location data from the GPS system can be stored in the tracking assembly, transmitted to the server, transmitted to eh controller, transmitted to a user over a wireless network or any combination thereof.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer codes, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A computerized system for a dynamic portable virtual boundary comprising:
    a controller having a controller computer readable medium and in communication with a tracking assembly;
    a display included in the controller;
    a set of controller computer readable instructions included in the controller computer readable medium configured for receiving a physical area image representing a physical area where a tracked object is disposed, displaying the physical area image on the display, and receiving a boundary information representing a physical boundary relative to the physical area for defining at least one of an enclosure area or a protected area, transmitting the boundary information to the tracking assembly; and,
    a set of tracking assembly computer readable instructions included in the tracking assembly configured for receiving the boundary information from the controller, determining a physical location of the tracking assembly relative to the boundary information, actuating a recall command if a communications signal strength between the controller and the tracking assembly reaches a predetermined signal strength and actuating a behavior action when the physical location of the tracking assembly crosses a boundary included in the boundary information.

2. The computerized system of claim 1 wherein the behavior action is taken from the group consisting of emitting an audio signal, administering an electric shock, vibrating, or any combination.

3. The computerized system of claim 1 wherein the behavior action is a first behavior action and the set of tracking assembly computer readable instructions for actuating a second behavior action when a location of the tracking assembly is within a predetermined distance of the boundary included in the boundary information.

4. The computerized system of claim 1 wherein the set of tracking assembly computer readable instructions include instructions for determining a trajectory of the tracking assembly and ceasing the behavior action when the trajectory of the tracking assembly is away from the boundary included in the boundary information.

5. The computerized system of claim 1 wherein the set of tracking assembly computer readable instructions include instructions for ceasing the behavior action after a predetermined period of time.

6. The computerized system of claim 1 wherein the set of tracking assembly computer readable instructions include instructions for entering tracking mode and transmitting the physical location of the tracking assembly to the controller at a predetermined rate.

7. The computerized system of claim 1 wherein the tracking assembly is a first tracking assembly and the set of tracking assembly computer readable instructions include instructions for actuating the behavior action if the first tracking assembly is determined to be within a predetermined distance of a second tracking assembly.

8. The computerized system of claim 1 wherein the tracking assembly is a first tracking assembly and the set of tracking assembly computer readable instructions include instructions for actuating a recall command if a power source included in the tracking assembly is reaches a predetermined power level.

9. The computerized system of claim 1 including a camera included in the controller configured to receive the physical area image.

10. A computerized system for a dynamic portable virtual boundary comprising:
    a controller having a controller computer readable medium and in communication with a tracking assembly;
    a display included in the controller;
    a set of controller computer readable instructions included in the controller computer readable medium configured for receiving a physical area image representing a physical area where a tracked object is disposed, displaying the physical area image on the display, receiving a boundary information representing a physical boundary relative to the physical area for defining at least one of an enclosure area or a protected area, receiving a first physical location from the tracking assembly, creating a first action request according to the first physical location and the boundary information, receiving a second physical location from the tracking assembly, determining a direction of the tracking assembly from the first physical location and the second physical location, transmitting the first action request to the tracking assembly, and sending a second action request to the tracking assembly if the determination is made that the tracking assembly is traveling toward a boundary included in the boundary information, and, a set of tracking assembly computer readable instructions included in the tracking assembly configured for determining the first physical location of the tracking assembly relative to the boundary information, transmitting the first physical location to the controller, receiving the first action request from the controller and actuating a behavior action according to the first action request.

11. A computerized system of claim 10 wherein the action request is created according to a trajectory received from the tracking assembly.

12. A computerized system of claim 10 wherein the controller is the combination of a portable computer device in communication with a server and the server in communication with the tracking assembly.

13. A computerized system of claim 10 wherein the set of controller computer readable instructions include instructions for sending a cease action request to the tracking assembly if a determination is made that the tracking assembly is traveling away from an adjacent boundary included in the boundary information.

14. A computerized system of claim 10 wherein:
the action request is a first action request;
the physical location is a first physical location; and,
the set of controller computer readable instructions include instructions for receiving a second physical location from the tracking assembly, determining a trajectory of the tracking assembly from the first physical location, the second physical location and a period of time between the first physical location and the second physical location and sending a second action request to the tracking assembly according to the trajectory.

* * * * *